United States Patent Office 3,500,112
Patented Mar. 10, 1970

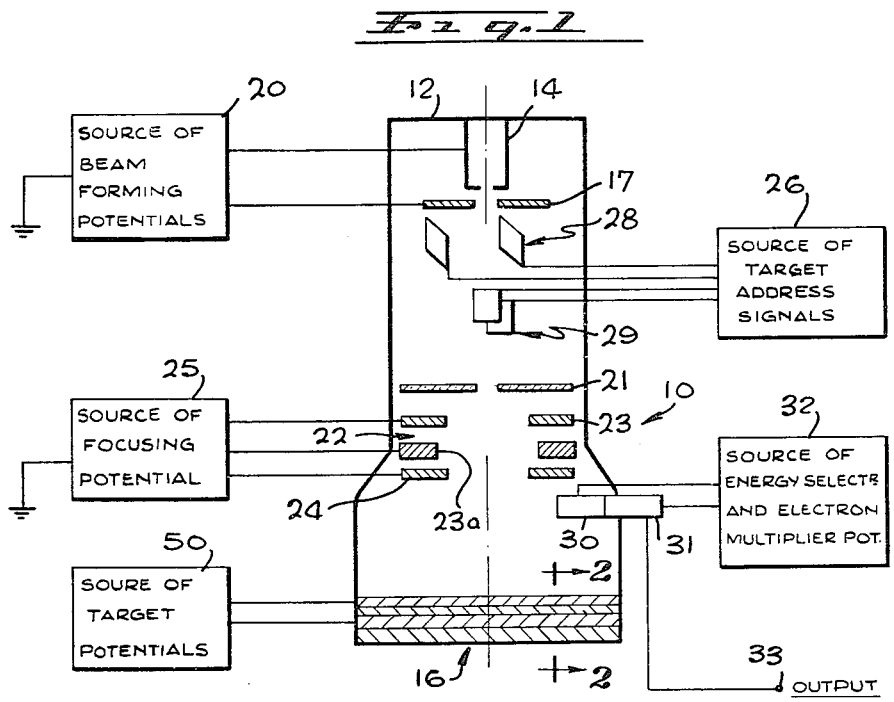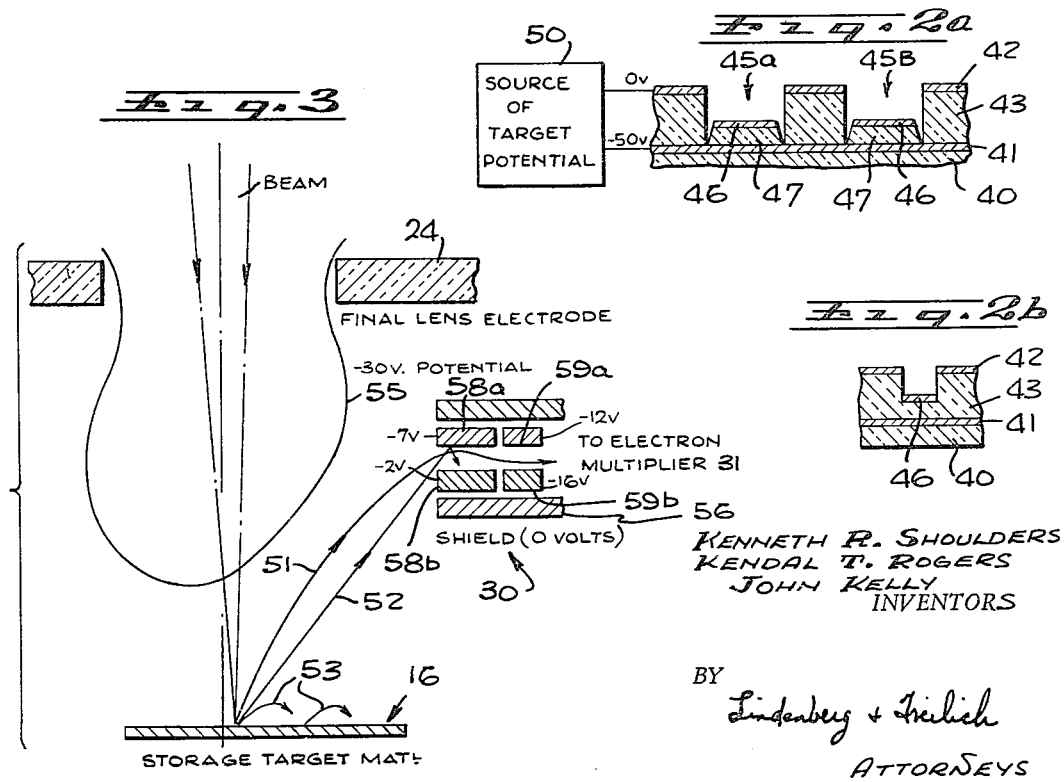

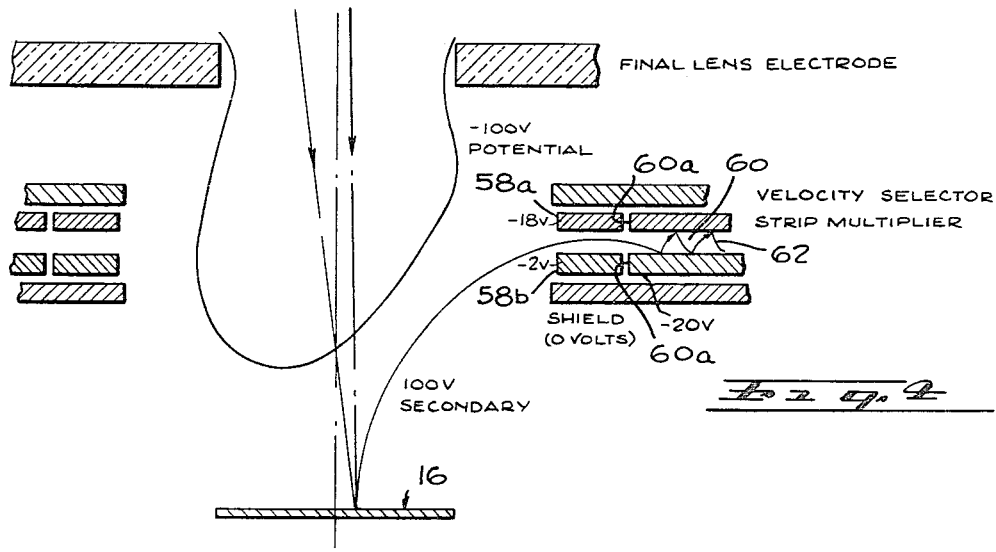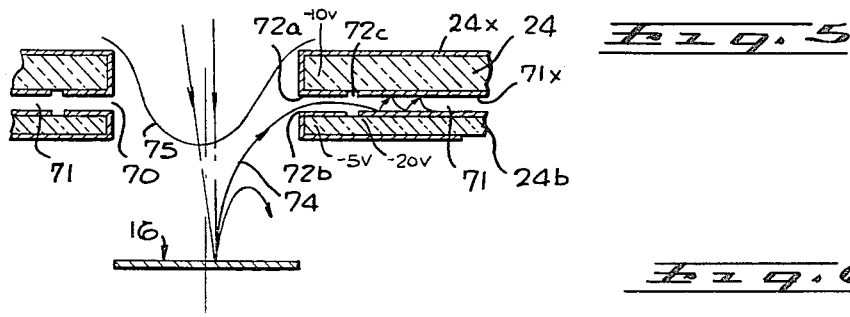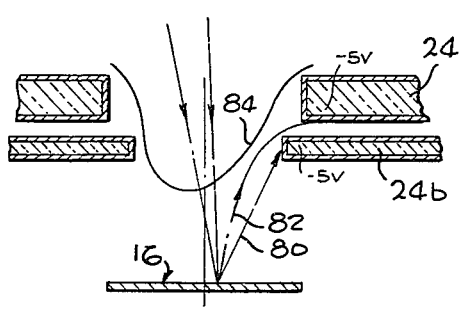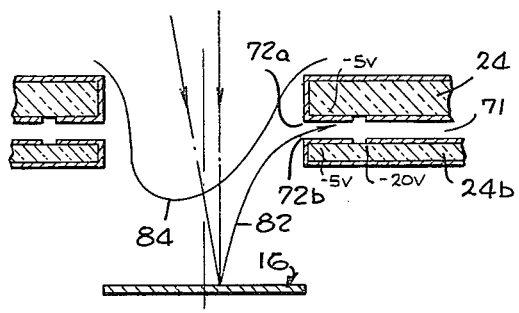

3,500,112
ELECTRON DEVICE WITH IMPROVED SECONDARY ELECTRON COLLECTION MEANS
Kenneth R. Shoulders, Redwood, Kendal T. Rogers, Los Altos, and John Kelly, Palo Alto, Calif., assignors to Stanford Research Institute, Menlo Park, Calif., a corporation of California
Filed May 9, 1968, Ser. No. 727,912
Int. Cl. H01j 29/41
U.S. Cl. 315—12
10 Claims

ABSTRACT OF THE DISCLOSURE

A method and arrangement are disclosed for reading out information on or regarding the features of a target by using certain energy selection arrangements and configurations to selectively detect secondary electrons, produced on the target with a secondary emission producing electron beam, and in particular, reading out data on a data storing target of a storage tube. A focusing arrangement is used with the electron beam, and the electrostatic field which extends through the final lens electrode of the focusing arrangement toward the target is used, in conjunction with an electrostatic energy selector, and/or an electron multiplier, to admit only electrons in a selected energy range. The potentials of the energy selector and/or multiplier and the field magnitude are chosen to inhibit electrons outside the selected energy range from reaching the electron multiplier.

BACKGROUND OF THE INVENTION

Field of the invention

This invention generally relates to electron devices and, more particularly, to improvements in an electron device in which selective secondary electron collection is required, such as a secondary electron scanning microscope, an image pick-up tube and an information storage tube and the like.

Description of the prior art

In a copending application, an information storage system is described, in which an isolated electrode is situated within each hole of approximately micron size in a metal-dielectric-metal sandwich-type arrangement. The isolated electrode in each hole, which can be thought of as forming part of a microcapacitor, may be charged either to near the lower metal layer potential to represent one state, such as a binary 1, or to the potential of the top metal layer, hereafter also referred to as the target's surface potential to represent an opposite state, such as a binary 0. Analog information storage is also possible by controlling the potential to which the isolated electrode is charged.

It is intended that any information, whether digital or analog, stored in the microcapacitor be read out by directing a non-penetrating secondary emission producing beam and detecting the magnitude of the secondary emission therefrom. The present invention is directed to improvements in the arrangements which are employed to read out the information stored in each microcapacitor of the target material. Likewise, the present invention is directed to improvements in any electron device in which a secondary electron producing beam is directed to a target and the secondary electrons produced by the target are selectively detected to determine target features.

OBJECTS AND SUMMARY OF THE INVENTION

It is a primary object of the present invention to provide improved means in an electron device in which secondary electrons are detected to determine the information stored in a target or to determine the features thereof.

Another object of the present invention is to provide improved means for reading out information, stored in a target material of a storage tube.

Yet another object of the invention is the provision of means for reading out information stored in information-storing target material of a storage tube as a function of secondary electrons emitted therefrom.

A further object of the invention is the provision of means for selectively detecting the electrons in any desired energy range from those emitted from any target surface or produced thereon by a primary electron beam.

Yet a further object of this invention is to provide an improved arrangement for collecting secondary electrons emitted from an information storing microcapacitor located in a hole of a sandwich-type target material of a storage tube, in order to determine the information stored thereat.

These and other objects of the invention are achieved by providing means which produce an electrostatic field which affects the trajectory of secondary electrons in a predetermined energy range, produced on a target, so that they are directed to a properly energized energy selector. In an electron device, such as a storage tube in which an electronic lens system is employed for beam focusing, advantage may be taken of the electrostatic lens field which extends into the region between a final lens electrode and the target, to provide the desired electrostatic field.

For example, some of the objects of the invention are achieved by providing a storage tube in which the information storing target material or simply target, is located at a relatively short distance from a final lens electrode of an electronic optical or lens arrangement which is employed to focus a beam of electrons, produced in the tube. A velocity or energy selector and an electron multiplier, to which selected potentials are applied, are positioned relative to the final lens electrode and the target material. The electrostatic lens field which extends into the region between the final lens electrode and the target is chosen so as to affect the trajectory of electrons in a predetermined energy range so that they are directed to the energy selector. The potentials applied to the energy selector and the multiplier are chosen to permit only electrons in a finite energy range to be admitted thereto as well as to be multiplied by the multiplier for final use in the information readout process.

To simplify the description of the teachings of the invention, hereafter the invention will be described in conjunction with an information storage tube, from which information is read out as a function of the production of secondary electrons in a selected energy range. However, it should be appreciated that the teachings may be employed to provide means in any electron device in which the detection of secondary electrons is employed to provide the desired output. For example, the teachings may be employed in a secondary electron scanning microscope, an image pick-up tube, and like devices, in which secondary electrons are used to provide information regarding the features of a target.

The novel features of the invention are set forth with particularity in the appended claims. The invention will best be understood from the following description when read in conjunction with the accompanying drawings.

BRIEF DESCRIPTION OF THE DRAWINGS

FIGURE 1 is a combination schematic and block diagram of a storage tube and associated circuitry which incorporates the present invention;

FIGURES 2a and 2b are partial cross-sectional views of two different embodiments of a target taken along lines 2—2 in FIGURE 1;

FIGURES 3 through 5 are partial side views useful in explaining different embodiments of the present invention; and FIGURES 6 and 7 are additional partial side views useful in explaining other embodiments of the present invention.

DESCRIPTION OF THE PREFERRED EMBODIMENTS

Reference is now made to FIGURE 1 which is a combination schematic and block diagram of sources of potentials and signals, used to control the operation of a storage tube 10, which incorporates the present invention. Briefly, storage tube 10 consists of an evacuated envelope 12 in which an electron producing element 14 is located at one end of the envelope. An information storing target 16 is located at the opposite envelope end with respect to the tube's longitudinal or central axis. An anode 17, which together with the element 14 is connected to a source of beam forming potentials 20, is disposed between the element 14 and the target 16. In practice, source 20 provides potentials with respect to a reference potential, such as ground, to the element 14 and the anode 17 so that electrons leave element 14 and are attracted by the anode to propagate towards the target 16. The storage tube may further include a disc 21 with a central aperture, chosen to limit the maximum diameter of the beam which is formed of the electrons which pass therethrough.

Storage tube 10 also includes an electronic optical system 22 which for explanatory purposes is shown consisting of three lens electrodes 23, 23a and 24, which are connected to a source of focusing potentials 25. As is appreciated by those familiar with the art, the function of such lens electrodes is to focus the stream of electrons into a sharp, small diameter beam, so that the beam strikes only a selected point of the target 16. The point which the electron beam strikes may be selected by the appropriate supply of target address signals from a source 26 to a deflection system, which for explanatory purposes is shown as consisting of vertical deflection plates 28 and horizontal deflection plates 29. The deflection system may be of the magnetic or electrostatic type, known as a double deflection system, in which there are two sets of vertical deflectors and two sets of horizontal deflectors. Also, the deflection system may be located between the electronic optical system 22 and the target 16, or at other suitable locations.

The envelope 12 further houses an energy selector 30 and an electron multiplier 31. A source of potentials 32 is connected to selector 30 and the multiplier 31, the latter also being connected to an output terminal 33.

Before proceeding to describe the teachings of the invention, which are employed in the construction of a storage tube, reference is made to FIGURE 2a which is a partial cross-sectional view of one embodiment of the information storing target 16, the view being taken along lines 2—2 in FIGURE 1. Basically, the target 16 consists of a substrate 40, which may be a metal or an insulator on which there is deposited a metal layer 41, separated from a top metal layer 42 by a dielectric layer 43. An array or matrix of holes, two of which are designated 45A and 45B are formed in the metal 42, dielectric 43 and metal 41 sandwich-like combination. Each hole extends through layers 42 and 43 only.

Within each hole, an isolated metal layer or electrode 46 is disposed. Electrode 46 rests on a dielectric material 47, which in turn rests on the metal layer 41. The isolated electrode 46 in each hole and layer 41, from which it is spaced by the dielectric material 47, may be thought of as forming a microcapacitor whose charge represents the information stored therein. As seen in FIGURES 1 and 2, layers 41 and 42 are connected to a source of target potentials 50. Layer 42 is assumed to be at ground or zero potential and the bottom layer 41 at a negative potential (—v.), such as —50 volts. In an alternative embodiment, shown in FIGURE 2b, the holes extend through layer 42 and only partially through 43, and the isolated electrode 46 rests on the remainder of the dielectric layer 43.

As previously stated, a first binary state, such as binary 1, may be stored in a microcapacitor by setting the potential of the isolated electrode 46 at the potential (—v.) of the lower layer 41, while a binary 0 may be stored by setting the potential of layer 46 to be at the 0 or ground potential of top layer 42. Analog information may be stored by controlling the potential of the isolated electrode 46 to be any where between the potentials of the lower or upper metal layers 41 and 42 respectively. As previously briefly indicated, information is read out from a microcapacitor by directing a non-penetrating secondary emission producing beam thereto and detecting the secondary electrons emitted therefrom.

In accordance with the teachings of the present invention, the potentials which are supplied to and the positions of the final lens electrode 24 and the combination of energy selector 30 and multiplier 31 are chosen so that any secondary electrons in a chosen energy range which are emitted from any microcapacitor are directed into the energy selector 30 and are multiplied in multiplier 31 to provide the output at terminal 33. Briefly, the magnitude of the electrostatic field of the optical system 22 which extends through the final lens electrode 24 into the region between the electrode 24 and the target material 16 is used to affect the trajectory of secondary electrons in a selected energy range which are emitted from any of the microcapacitors. The trajectory is affected so that the selected electrons are directed to the selector 30. The potentials of the energy selector 30 are controlled to admit most of the electrons which are directed thereto. They are further controlled to permit only electrons of a chosen energy level to advance to and be multiplied in the multiplier 31.

These aspects of the invention may better be explained in conjunction with FIGURES 3 through 7, wherein elements like those previously described are designated by like numerals. As is appreciated, when a primary or secondary emission producing beam is directed at a microcapacitor in a hole of target material 16, the true secondary electrons produced within the hole have a mean energy of about 2 electron volts and emerge from the hole with an energy dependent on the potential of the isolated electrode 46. Specifically:

(1) When electrode 46 is at —v. volts relative to electrode 42, the emerging secondary electrons have a mean energy of about (v.+2) electron volts;

(2) When electrode 46 is at 0 or layer 42 potential, the emerging secondary electrons have a mean energy of 2 electron volts.

Two other groups of electrons produced by the primary beam require consideration:

(3) Secondary electrons from the surface layer 42, which have a mean energy of about 2 electron volts;

(4) Elastically scattered primary electrons from all surfaces exposed to the beam, which have energies much higher than the secondary electrons in the first three groups.

The binary states of an element, i.e., a microcapacitor in a hole can be distinguished by determining whether the emerging electrons are in group 1 or group 2 with the energy selector 30. In particular, since group 3 electrons have the same mean energy as group 2 electrons, the velocity selector 30 is adjusted to pass group 1 electrons through to the multiplier 31 and block electrons in groups 2 and 3. Most of the higher energy group 4 electrons are also prevented from entering the velocity selector 30 by appropriate geometric arrangement, and the few that do enter produce secondary electrons of mean energy corresponding to group 3. Thus only group 1 electrons can reach the multiplier 31.

In FIGURE 3, numerals 51 and 52 represent the trajectories of electrons in groups 1 and 4, while numeral 53 represents the trajectories of groups 2 and 3 electrons. Also, in FIGURE 3, one of the equipotential lines (−30 v.) corresponding to the electrostatic field of the optical system 22 extending through final lens electrode 24 towards the target 16 is designated by numeral 55. It is this field which is used to affect the trajectories of most of the electrons so that only the electrons of group 1 are directed to the energy selector 30.

Therein, the selector is shown consisting of a housing or shield 56, a first pair of deflector plates 58a and 58b and a second pair of plates 59a and 59b. The housing and the four plates are separately connected to the source 32 (FIGURE 1) for individual biasing, the values of which are selected to pass only group 1 electrons of the desired energies. The voltages shown for the housing 56 and the four plates, as well as the magnitude of field 55 represent near optimum values for attracting group 1 electrons having a mean energy of 25 electron volts and an energy bandwidth of about 5 electron volts. Other bias values are used for other mean energies and bandwidths. Also, the secondary electrons produced by elastically scattered primary (group 4) electrons which strike the outer plates 58a and 58b are blocked by the more negative bias values applied to plates 59a and 59b than to plates 58a and 58b.

The field used to bend the electrons toward the selector may also be provided by separate means instead of the lens field represented by 55. The group 1 electrons, which pass through the energy selector 30, may be supplied to any known electron multiplier 31. The use of a continuous dynode strip electron multiplier has been found to be quite advantageous, producing most satisfactory results. Such a dynode strip electron multiplier is designated by numeral 60 in FIGURE 4. Therein the electron multiplication is represented by the succession of arrows 62.

As seen in FIGURE 4, the selector 30 is shown including only the first pair of deflector plates 58a and 58b. When only one pair of deflectors is employed, the front end 60a of multiplier 60 is set to be negative, such as −20 volts, with respect to the first deflector plate pair 58a–58b for the same reason that plates 59a and 59b (FIGURE 3) are held negative with respect to plates 58a and 58b. For illustrative purposes, the potentials shown in FIGURE 4 are for transmitting group 1 electrons having a mean energy of 100 electron volts to the multiplier 60.

Since in accordance with the preferred teachings of this invention, use is made of the field which extends through the final lens electrode 24 to affect the trajectories of secondary electrons so that some of the secondaries are directed to the selector 30, in one embodiment of the invention the structure of the lens electrode 24 is used to support conductive films which form part of the selector. One such arrangement is shown in FIGURE 5, wherein an axially symmetric energy selector 70 is diagrammed. The selector is shown feeding a continuous dynode multiplier 71 of axial symmetry. The axially symmetric arrangement has the added advantage of accepting group 1 electrons distributed over the entire 360° range of azimuthal angle relative to the lens axis.

As seen from FIGURE 5, the lens electrode 24 consists of an insulator coated with a conductive lens film 24x covering the upper surface and extending around the aperture and partially covering the lower surface to constitute deflector plate 72a of selector 70. A resistive/ secondary-electron-producing film 71x covers the remainder of the lower surface of 24 except for a small gap 72c. A similarly constructed electrode 24b is added, the upper surface of which is coated in a manner like the lower surface of electrode 24 and together with electrode 24 comprises the axially symmetric energy selector 70 and continuous dynode multiplier 71.

In this embodiment of the present invention, like in all others, the electrons in the selected energy range represented by line 74 are bent into the selector entrance by the protruding lens field, designated by equipotential line 75. The secondary electrons are arranged to strike the multiplier film 71x with sufficient energy to multiply therein. The potentials designated in FIGURE 5 are for the selection and multiplication of 100 volt electrons.

In some applications, it may be possible to eliminate the deflection field represented by the potentials of plates 72a and 72b and connect both film plates to the same potential and rely entirely on the action of the lens field 75 to direct the electrons into the selector 70, so that the electrons strike the front end of multiplier 71. Such an arrangement is shown in FIGURE 6, in which the energy barrier is produced by the more negative potential (−20 v.) of the multiplier 71 relative to the potential of the plates 72a and 72b (−5 v.).

In still another arrangement diagrammed in FIGURE 7, the energy barrier is eliminated also, and the high velocity, elastically scattered electrons, designated by line 80, are prevented from reaching the multiplier 71 by extending the structure of electrode 24b so that the elastically scattered electrons are screened geometrically from the multiplier entrance. In FIGURES 6 and 7, lines 82 and 84 represent the secondary electrons and the equipotential line of the protruding lens field, respectively.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In an electron device of the type including a target, means for generating an electron beam which is directed to said target to produce detectable secondary electrons, to derive signals indicative of target characteristics, the improvement comprising:

first means for providing an electrostatic field extending from said first means toward said target; and energy selecting means of preselected geometric arrangement and configuration, and including energy selecting potential source means, providing a plurality of potentials, and positioned with respect to the target and said first means, whereby the trajectories of secondary electrons, having a selected mean energy level which are emitted by said target, are affected by said electrostatic field of said first means, to be directed to, and received by, said energy selecting means, said first means including electronic optic means, including focusing potential source means and a lens electrode positioned in the path of said beam which is directed to said target, with the electrostatic field extending through said lens electrode into the region between said electronic optics means and said target to affect the trajectories of secondary electrons emitted therefrom, said energy selecting means include an energy selector having at least a pair of deflector plates connected to said potential source means to receive at least two different potentials therefrom.

2. In an electron device as recited in claim 1 wherein at least one of said deflector plates is a conductive film deposited on said lens electrode.

3. In a data storage tube of the type including means for generating an electron beam and for selectively directing said beam at a selected portion of a target for storing data therein and for reading data stored thereat as a function of secondary electrons emitted therefrom, the improvement comprising:

electronic optics means including focusing potential source means positioned in the path of said electron beam for focusing said beam directed at said target material; and energy selecting means including energy selecting potential source means providing a plurality of potentials, said energy selecting means being of preselected geometric arrangements and configurations with respect to said target and said optic means, whereby a potential field extends from said electronic optics means into the region between it and said target to affect the trajectory of electrons emitted by said target, so that electrons in a preselected energy range are directed to and received by said energy selecting means.

4. In a data storage tube as recited in claim 3 wherein said energy selecting means include an energy selector having at least a pair of deflector plates connected to said potential source means to receive at least two different potentials therefrom, and an electron multiplier to which electrons which are directed to said energy selector and pass therethrough are directed for multiplication therein.

5. In a data storage tube as recited in claim 4 wherein the potential field of said electronic optics means extends into the region between said electronic optics means and said target material so that electrons emitted from said target material are affected by said field with the trajectory of electrons in said preselected energy range being affected so that they enter the energy selector in a direction to be directed as a function of the potentials of said deflector plates to said electron multiplier.

6. In a data storage tube as recited in claim 5 wherein said deflector plates are conductive films deposited on a final lens electrode of said electronic optic means, and said electron multiplier.

7. In a data storage tube as recited in claim 3 wherein said target material is connected to a target-material source of potential whereby a portion of said material storing a first binary level emits secondary electrons including electrons in a selected energy range when data is read out therefrom, the portion when storing a second binary level emits secondary electrons which do not include electrons in said selected energy range, said electronic optics means and said energy selecting means having potentials applied thereto and positioned so that the potential field of said electronic optics means affects the trajectory of the electrons in said selected energy level to direct them to said energy selecting means, which includes an electron multiplier struck by said selected electrons with a sufficiently high energy to be multiplied therein.

8. In a data storage tube as recited in claim 7 wherein said energy selecting means includes an energy selector with at least two deflector plates connected to said potential source means to receive different potentials therefrom whereby electrons in said selected energy range may be admitted.

9. In a data storage tube of the type including means for generating electrons, electronic optics means for focusing said electrons as a beam, means for selectively directing said beam at a selected portion of target material for storing data therein and for reading data stored thereat as a function of secondary electrons emitted therefrom the method of optimizing the reception of said secondary electrons when reading out the data stored in any portion of said target material, the steps comprising:

providing in said data storage tube electron selecting means;

fixedly positioning said electron selecting means and said optics means with respect to said target material and with respect to one another; and applying selected potentials to said electronic optics means and said electron selecting means so that a potential field produced as a function of potentials applied to said electronic optics means extends therethrough toward said target material to affect the trajectory of secondary electrons and to direct electrons in a selected energy range to said energy selecting means.

10. The method as recited in claim 9 wherein said energy selecting means includes an electron multiplier, the potentials being applied to said electronic optics means and to said electron multiplier so that the potential field of said electronic optics means which extends into the region between the electronic optics means and the target material controls the trajectory of electrons in a selected energy range causing them to reach said multiplier with sufficient energy to be multiplied therein.

References Cited

UNITED STATES PATENTS

| | | | |
|---|---|---|---|
| 2,900,559 | 8/1959 | Ruetz | 315—12 X |
| 3,184,633 | 5/1965 | White et al. | 315—12 |
| 3,235,765 | 2/1966 | Goodrich et al. | 315—12 |

RODNEY D. BENNETT, JR., Primary Examiner

JEFFREY P. MORRIS, Assistant Examiner

U.S. Cl. X.R.

313—68